(12) United States Patent
Takiguchi et al.

(10) Patent No.: US 9,865,375 B2
(45) Date of Patent: Jan. 9, 2018

(54) SHIELDED ELECTRIC WIRE AND WIRE HARNESS

(71) Applicant: Yazaki Corporation, Tokyo (JP)

(72) Inventors: Tomomi Takiguchi, Susono (JP); Yoshihiko Sato, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/434,549

(22) Filed: Feb. 16, 2017

(65) Prior Publication Data

US 2017/0256336 A1 Sep. 7, 2017

(30) Foreign Application Priority Data

Mar. 1, 2016 (JP) .................. 2016-039466

(51) Int. Cl.
*H01B 7/00* (2006.01)
*H01B 7/282* (2006.01)
*B60R 16/02* (2006.01)

(52) U.S. Cl.
CPC ......... *H01B 7/282* (2013.01); *B60R 16/0215* (2013.01); *H01B 7/0045* (2013.01)

(58) Field of Classification Search
CPC .......... H05K 9/0018; H05K 5/06; H05K 5/04; H02G 3/00; H02G 3/0431; H02G 3/08; H02G 3/10; H02G 3/02; H02G 3/04; H02G 3/06; H02G 15/043; H02G 3/0658; H02G 3/0666; H02G 3/088; H02G 3/18; H02G 3/22; H02G 15/06; H02G 15/076; H02G 3/16; H02G 3/081; H02G 3/14; H02G 7/20; H02G 7/056; H02B 1/40; H01H 9/02; B60R 16/0207; B60R 16/0215; H01R 11/11; H01R 4/023; H01R 4/22; H01L 23/10; H01L 23/52; H01B 7/0045; H01B 7/282
See application file for complete search history.

(56) References Cited

U.S. PATENT DOCUMENTS

| 4,424,867 A * | 1/1984 | Mallow ................... C04B 40/06 156/48 |
| 7,304,244 B1 * | 12/2007 | Dower ................... H02G 3/088 174/92 |
| 2002/0039858 A1 * | 4/2002 | Kamel ..................... H01R 4/22 439/521 |

FOREIGN PATENT DOCUMENTS

| JP | 2000278838 A | 10/2000 |
| JP | 200867545 A | 3/2008 |

* cited by examiner

*Primary Examiner* — Pete Lee
(74) *Attorney, Agent, or Firm* — Sughrue Mion, PLLC (57) ABSTRACT

A shielded electric wire includes electric wires, a shielding member that covers peripheries of the electric wires, a viscoelastic body that covers the peripheries of the electric wires, a sheet member having first and second sheet member covering peripheries of the shielding member and the viscoelastic body, and a protecting member provided around the sheet member. The first and second sheet members are pasted onto the shielding member and the viscoelastic body so that a pasted portion protruding in a width direction is formed. A force of adhesion of the viscoelastic body to the plurality of electric wires and the adhesive layers of the first and second sheet member is not less than 0.59 N/10 mm. A force of adhesion of the adhesive layers of the first and second sheet members to the viscoelastic body is not less than 0.59 N/10 mm.

7 Claims, 10 Drawing Sheets

WIDTH DIRECTION

SHIELDED ELECTRIC WIRE AND WIRE HARNESS

CROSS REFERENCE TO RELATED APPLICATIONS

This application is based on Japanese Patent Application (No. 2016-039466) filed on Mar. 1, 2016, the contents of which are incorporated herein by reference.

BACKGROUND OF THE INVENTION

1. Field of the Invention

The present invention relates to a shielded electric wire with water-stopping function and a wire harness.

2. Description of the Related Art

In electric wiring in cars, shielded electric wires provided with a shielding layer (electromagnetic wave shielding layer) around an electric wire performing signal transmission or the like are used for wiring to devices subject to the influence of noise or likely to cause noise. Some of such shielded electric wires are constituted, for example, by a plurality of electric wires formed of at least one signal wire and one drain wire, a shielding layer covering these plurality of electric wires and a protecting tape.

In the shielded electric wires as described above, there is a concern that water enters from an end portion of an electric wire, the water corrodes the metallic shielding layer to degrade the shielding function. For this reason, for example, a water stopping structure as described in Patent Document 1 is proposed in order to prevent water entrance. In the water stopping structure described in Patent Document 1, water is stopped by interposing an elastic body such as butyl rubber between the plurality of electric wires and winding an adhesive tape around the interposed portion (see JP-A-2000-278838).

However, in the water stopping structure described in JP-A-2000-278838, since it is necessary to knead the elastic body such as butyl rubber and cause it to penetrate between the plurality of electric wires before interposing the elastic body such as butyl rubber between the electric wires, regarding the water stopping, quality varies and becomes unstable because of the kneading which is handwork. Consequently, regarding the airtightness of the shielded electric wire, quality becomes unstable.

SUMMARY OF THE INVENTION

The present invention is made in order to solve such a conventional problem; and an object thereof is to provide a shielded electric wire with water-stopping function and a wire harness capable of having a more stable airtightness.

A shielded electric wire with water-stopping function according to the present invention including:

a plurality of electric wires;

a shielding member that covers peripheries of the plurality of electric wires;

a viscoelastic body attached between end portions of the plurality of electric wires and the shielding member and that covers the peripheries of the plurality of electric wires;

a sheet member that covers peripheries of the shielding member and the viscoelastic body; and a protecting member provided around the sheet member, wherein the sheet member includes a first sheet member and a second sheet member;

wherein adhesive layers are formed on one surfaces of the first and second sheet members respectively, and are pasted onto the shielding member and onto the viscoelastic body so as to face to each other so that a pasted portion in which the adhesive layers at one end portions of the first and second sheet members protruding in a width direction are pasted together is formed, the width direction being substantially perpendicular to an extending direction of the plurality of electric wires;

wherein a force of adhesion of the viscoelastic body to the plurality of electric wires and the adhesive layers of the first and second sheet member is not less than 0.59 N/10 mm;

wherein a force of adhesion of the adhesive layers of the first and second sheet members to the viscoelastic body is not less than 0.59 N/10 mm; and wherein a width of the pasted portion of the first and second sheet member is not less than 0.88 mm.

For example, the adhesive layers of the first and second sheet members are pasted onto the shielding member and onto the viscoelastic body so as to face to each other so that another pasted portion in which the adhesive layers at the other end portions of the first and second sheet members protruding in a direction opposite to the width direction is formed, and a width of the another pasted portion of the first and second sheet member is not less than 0.88 mm.

For example, the other end portions of the first and second sheet members are continuously connected to each other so as to be substantially U-shaped in cross section.

According to these shielded electric wires, since the force of adhesion of the viscoelastic body to the plurality of electric wires and the adhesive layer of the sheet member is not less than 0.59 N/10 mm and the force of adhesion of the adhesive layer of the sheet member to the viscoelastic body is not less than 0.59 N/10 mm, the moisture entering through the gap between the electric wires and the viscoelastic body and the gap between the viscoelastic body and the sheet member is suppressed by a predetermined adhesive force. Moreover, the width of the pasted portion and the another pasted portion of the sheet member is set to not less than 0.88 mm, the moisture entering through the gap at the pasted portion can also be suppressed by securing the width (length) of the pasted portion. By these, the shielded electric wire capable of having a more stable airtightness can be provided.

For example, the force of adhesion of the viscoelastic body to the plurality of electric wires and the adhesive layer of the sheet member is not less than 1.79 N/10 mm, the force of adhesion of the adhesive layers of the first and second sheet members to the viscoelastic body is not less than 1.79 N/10 mm, and the width of the pasted portion of the sheet member is not less than 2.66 mm.

According to this shielded electric wire, since the force of adhesion of the viscoelastic body to the plurality of electric wires and the adhesive layer of the sheet member is not less than 1.79 N/10 mm and the force of adhesion of the adhesive layer of the sheet member to the viscoelastic body is not less than 1.79 N/10 mm, the moisture entering through the gap between the viscoelastic body and the sheet member is suppressed by a higher adhesive force. Moreover, since the width of the pasted portion of the sheet member is not less than 2.66 mm, the moisture entering through the gap at the pasted portion can also be further suppressed. Consequently, the shielded electric wire capable of satisfying a higher airtightness can be provided.

For example, the viscoelastic body is disposed only between end portions of the plurality of electric wires and the shielding member.

According to this shielded electric wire, since the viscoelastic body is disposed only on one electric wire end portion side, the shielded electric wire can be provided that is appropriate for a case where, for example, only one side is disposed in an environment of being exposed to rain water such as in the engine room and the other side is disposed in an environment of not being exposed to rain water such as in the vehicle interior.

For example, a pullout load when the plurality of electric wires are each pulled out while the viscoelastic body is fixed is not less than 8 N.

According to this shielded electric wire, since the pullout load when the viscoelastic body is fixed and the plurality of electric wires are each pulled out is not less than 8 N, the shielded electric wire can be provided that has an airtightness of not less than a certain degree regarding between the electric wires and the viscoelastic body.

Moreover, the wire harness of the present invention has at least one circuit of the above-described shielded electric wire.

According to the wire harness of the present invention, since at least one circuit of the above-described shielded electric wire is provided, the wire harness can be provided that has the shielded electric wire suitable for the environment of being exposed to rain water such as in the engine room of a car.

According to the present invention, a shielded electric wire with water-stopping function and a wire harness can be provided that are capable of having a more stable airtightness.

DETAILED DESCRIPTION OF THE EXEMPLARY EMBODIMENTS

Hereinafter, the present invention will be described in accordance with preferred embodiments. The present invention is not limited to the embodiments shown below and may be modified as appropriate without departing from the gist of the present invention. Moreover, while there are parts where illustrations and descriptions of some components are omitted in the embodiments shown below, it is to be noted that regarding details of the omitted technologies, publicly known or well-known technologies are applied as appropriate within the bounds of not being inconsistent with the contents described below.

Figure 1:
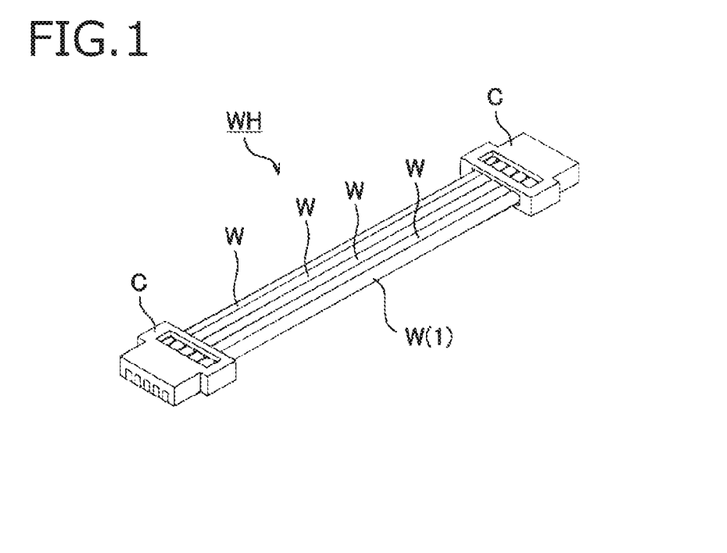
FIG. 1 is a wire harness including a shielded electric wire with water-stopping function according to an embodiment of the present invention.

FIG. 1 shows a wire harness including a shielded electric wire with water-stopping function according to an embodiment of the present invention. As shown in FIG. 1, the wire harness WH is a plurality of electric wires W tied in a bundle, and at least one (one circuit) of the plurality of electric wires W is formed of a shielded electric wire 1 described below in detail. Such a wire harness WH, for example, may be provided with connectors C at both end portions of the electric wires W as shown in FIG. 1 or may be wound by tape (not shown) for bundling the plurality of electric wires W. Moreover, the wire harness WH may be provided with an external part such as a corrugate tube (not shown) or may be provided with branching portions on the electric wires W.

Figure 2:
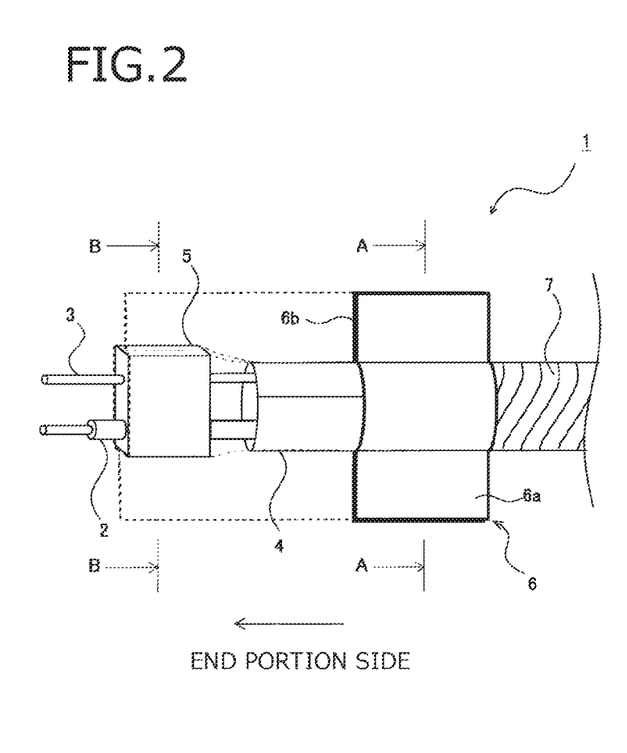
FIG. 2 is a perspective view showing the shielded electric wire shown in FIG. 1.

FIG. 2 is a perspective view showing the shielded electric wire 1 shown in FIG. 1. The shielded electric wire 1 according to the present embodiment is formed of a plurality of electric wires 2 and 3, a metallic foil material (shielding member) 4, a viscoelastic body 5, a sheet member 6 and a protecting tape (protecting member) 7.

The plurality of electric wires 2 and 3 are formed of one covered electric wire 2 and one drain wire 3. The covered electric wire 2 is formed of a core wire (conductor portion) the periphery of which is covered with an insulating covering (covering portion), and is an electric wire having no shielding layer. While the number of covered electric wires 2 is one in the present embodiment, the present invention is not limited thereto and the number may be more than one. Moreover, when the number is more than one, the plurality of covered electric wires 2 may be intertwisted at a predetermined twisting pitch and bundled into one electric wire bundle to form a twisted wire.

The drain wire 3 is a naked electric wire having substantially the same cross-sectional area as that of the core wire of the covered electric wire 2, and the length thereof is set to substantially the same length as that of the covered electric wire 2. The drain wire 3 is longitudinally added to the covered electric wire 2. To each of the end portions of the covered electric wire 2 and the drain wire 3, a connecting terminal (not shown) is connected. The drain wire 3 is grounded and connected to a grounding portion of a device or the like situated on the end portion side of each covered electric wire 2.

While an example in which the drain wire 3 is a naked electric wire is shown in the present embodiment, the present invention is not limited thereto and it may be formed of a covered electric wire having a conductor portion and a covered portion. Moreover, when the drain wire 3 is a covered electric wire, the covered portion of the drain wire 3 is stripped off at the portion of connection with the metallic foil material 4.

The metallic foil material 4 covers the peripheries of the covered electric wire 2 and the drain wire 3 (the peripheries of a plurality of electric wires) to form a shielding layer. Such a metallic foil material 4 is formed, for example, by providing a metallic foil layer (for example, an aluminum foil layer) on one surface of a polyethylene film which is an insulating material. The metallic foil layer functions as the shielding layer. The metallic foil material 4 is wound around the outer peripheries of the covered electric wire 2 and the drain wire 3 with the metallic foil layer facing inside. The wound metallic foil material 4 comes to have continuity with the drain wire 3 by the metallic foil layer coming into contact with the drain wire 3. It is preferable that a conductive adhesive agent (not shown) be filled between the electric wire bundle formed of the covered electric wire 2 and the drain wire 3, and the metallic foil material 4 to thereby enhance the stability of the continuity between the metallic foil layer and the drain wire 3.

The viscoelastic body 5 is a member capable of adhering to surrounding members. This viscoelastic body 5 is butyl rubber attached so as to cover the peripheries of the covered electric wire 2 and the drain wire 3 on the electric wire end portion side of the place where the metallic foil material 4 is provided, and is provided from the viewpoint of airtightness (water stopping). While the viscoelastic body 5 is, for example, butyl rubber in the present embodiment, the present invention is not specifically limited thereto and it may be natural rubber, synthetic rubber or polymer gel.

The sheet member 6 covers the peripheries of the metallic foil material 4 and the viscoelastic body 5, and is provided from the viewpoint of abrasiveness and airtightness. While in FIG. 2, the sheet member 6 is shown by the solid line as if to be provided only on the metallic foil material 4 and not to cover the periphery of the viscoelastic body 5, in actuality, the sheet member 6 also covers the periphery of the viscoelastic body 5 as shown by the broken line.

Figure 3:
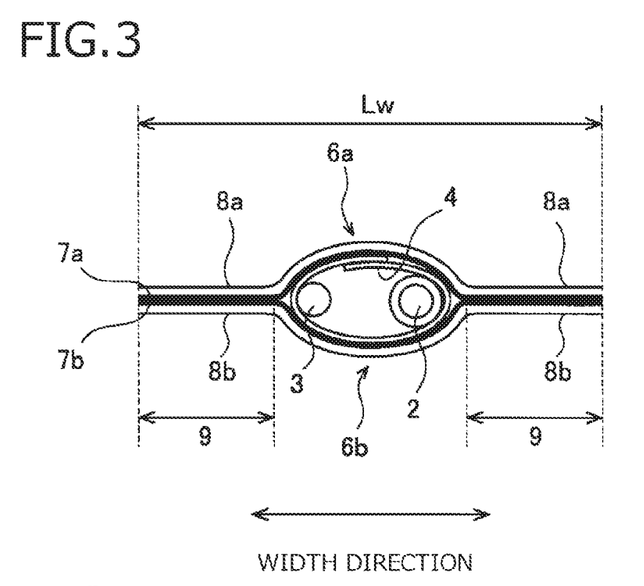
FIG. 3 is a A-A cross-sectional view of the shielded electric wire shown in FIG. 2.
Figure 4:
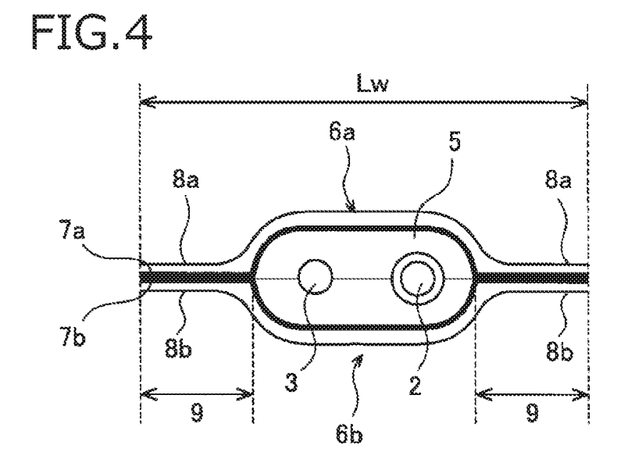
FIG. 4 is a B-B cross-sectional view of the shielded electric wire shown in FIG. 2.

FIG. 3 is an A-A cross-sectional view of the shielded electric wire 1 shown in FIG. 2, and FIG. 4 is a B-B cross-sectional view of the shielded electric wire 1 shown in FIG. 2. As shown in FIG. 3 and FIG. 4, the sheet member 6 is formed of two sheet members 6a and 6b of a first sheet member 6a and a second sheet member 6b.

The sheet members 6a and 6b are each an adhesive tape or an adhesive sheet where adhesive layers 7a and 7b are formed by applying an adhesive agent to one surface of a film of polyvinyl chloride or the like which is non-porous and difficult to swell with water, be eluted and dissolve, and has a predetermined thickness (for example, not less than 0.01 mm and not more than 0.19 mm).

Moreover, the sheet members 6a and 6b each have a large width Lw protruding from the metallic foil material 4 and the viscoelastic body 5 in the width direction, and are pasted to the metallic foil material 4 from the side facing the metallic foil material 4 and the viscoelastic body 5. And the sheet members 6a and 6b form pasted portions 9 by the adhesive layers 7a and 7b and the counterpart adhesive layers 7b and 7a being pasted together in surplus portions 8a and 8b protruding in the width direction.

FIG. 2 is referred to again. As shown in FIG. 2, the protecting tape 7 is a long tape, and is spirally wound around the outer periphery of the sheet member 6. As the protecting tape 7, an adhesive tape or the like where an adhesive layer is formed on the inner surface of a tape material may be used. Moreover, the protecting tape 7 is in a laminated state having two or more layers continuously over the direction of the length of the electric wire by being spirally wound in such a manner as to overlap, that is, wrap itself around the sheet member 6. For example, the protecting tape 7 is wound in such a manner as to be half wrapped in the direction of the tape width into a two-layer laminated state or is wound in such a manner as to be ⅔-wrapped in the tape width direction into a three-layer laminated state. It is not always necessary that the protecting tape 7 is in a laminated state having two layers continuously.

Further, in the present embodiment, the force of adhesion of the viscoelastic body 5 to the plurality of electric wires 2 and 3 and the adhesive layers 7a and 7b of the sheet member 6 is not less than 0.59 N/10 mm, and the force of adhesion of the adhesive layers 7a and 7b of the sheet member 6 to the viscoelastic body 5 is not less than 0.59 N/10 mm. Moreover, the width (the length in the width direction) of the shortest distance portion of the pasted portions 9 of the sheet member 6 is not less than 0.88 mm.

Here, the water entrance paths in the shielded electric wire 1 according to the present embodiment are the following three: 1) the gap between the electric wires 2 and 3 and the viscoelastic body 5, 2) the gap between the viscoelastic body 5 and the sheet member 6, and 3) the gap at the pasted portions 9.

For this reason, if the force of adhesion of the viscoelastic body 5 to the plurality of electric wires 2 and 3 and the sheet member 6 is not less than 0.59 N/10 mm and the force of adhesion of the adhesive layers 7a and 7b of the sheet member 6 to the viscoelastic body 5 is not less than 0.59 N/10 mm, moisture entering through the gaps of 1) and 2) is suppressed by a predetermined adhesive force.

Moreover, since the width of the pasted portions 9 of the sheet member 6 is not less than 0.88 mm, the moisture entering through the gap of 3) is suppressed by securing the width (the length in the width direction) of the pasted portions 9. These provide the shielded electric wire 1 capable of having a more stable airtightness (for example, an airtightness of 49 kPa in a test described later).

It is preferable that the force of adhesion of the viscoelastic body 5 to the plurality of electric wires 2 and 3 and the adhesive layers 7a and 7b of the sheet member 6 be not less than 1.79 N/10 mm, the force of adhesion of the adhesive layers 7a and 7b of the sheet member 6 to the viscoelastic body 5 be not less than 1.79 N/10 mm and the width of the shortest distance portion of the pasted portions 9 of the sheet member 6 be not less than 2.66 mm. This is because the shielded electric wire 1 having a higher airtightness (for example, an airtightness of 150 kPa in a test described later) can be provided by this.

Moreover, in the present embodiment, it is preferable that the viscoelastic body 5 be disposed only on one electric wire end portion side of the place where the metallic foil material 4 is provided and be not disposed on the other electric wire end portion side. This is because by this, the shielded electric wire 1 can be provided that is appropriate for a case where, for example, only one side is disposed in an environment of being exposed to rain water such as in the engine room and the other side is disposed in an environment of not being exposed to rain water such as in the vehicle interior.

In addition, it is preferable that the viscoelastic body 5 according to the present embodiment be made of a butyl rubber with an SP value of 7.7 to 8.1 and the adhesive layers 7a and 7b of the sheet member 6 be made of a natural rubber with an SP value of 7.9 to 8.4 or a styrene-butadiene rubber with an SP value of 8.1 to 8.7. This is because by using materials having close SP values as mentioned above, compatibility between the viscoelastic body 5 and the adhesive layers 7a and 7b becomes high and these are united to facilitate the securement of a higher airtightness.

Further, in the present embodiment, in the shielded electric wire 1, the protecting tape 7 is peeled off, of the plurality of electric wires 2 and 3, the electric wires 2 and 3 except one electric wire and the viscoelastic body 5 are fixed, and the pullout load when the one electric wire is pulled out from the viscoelastic body 5 is not less than 8 N at all the electric wires 2 and 3. This is because by doing this, the shielded electric wire 1 having an airtightness above a certain level can be provided by securing a pullout load (that is, an adhesive force) of 8N even if the materials of the plurality of electric wires 2 and 3 and the viscoelastic body 5 have SP values different from each other to some extent.

Figure 5:
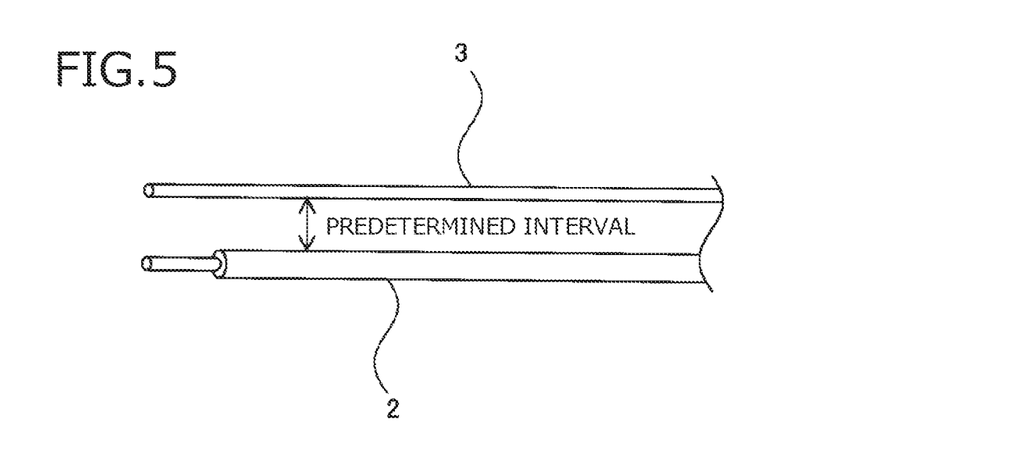
FIG. 5 is a process drawing showing a method of manufacturing the shielded electric wire according to the present embodiment, and showing a first step.

Next, a method of manufacturing the shielded electric wire 1 according to the present embodiment will be described. FIG. 5 to FIG. 13 are process drawings showing the method of manufacturing the shielded electric wire 1 according to the present embodiment. First, as shown in FIG. 5, the worker or the like disposes the plurality of electric wires 2 and 3 on the same plane. At this time, the worker or the like parallelly disposes the plurality of electric wires 2 and 3 at an interval of not less than 1 mm (predetermined interval) (first step). At the first step, it is preferable to use a jig for parallelly disposing the plurality of electric wires 2 and 3 on the same plane at the predetermined interval.

Figure 6:
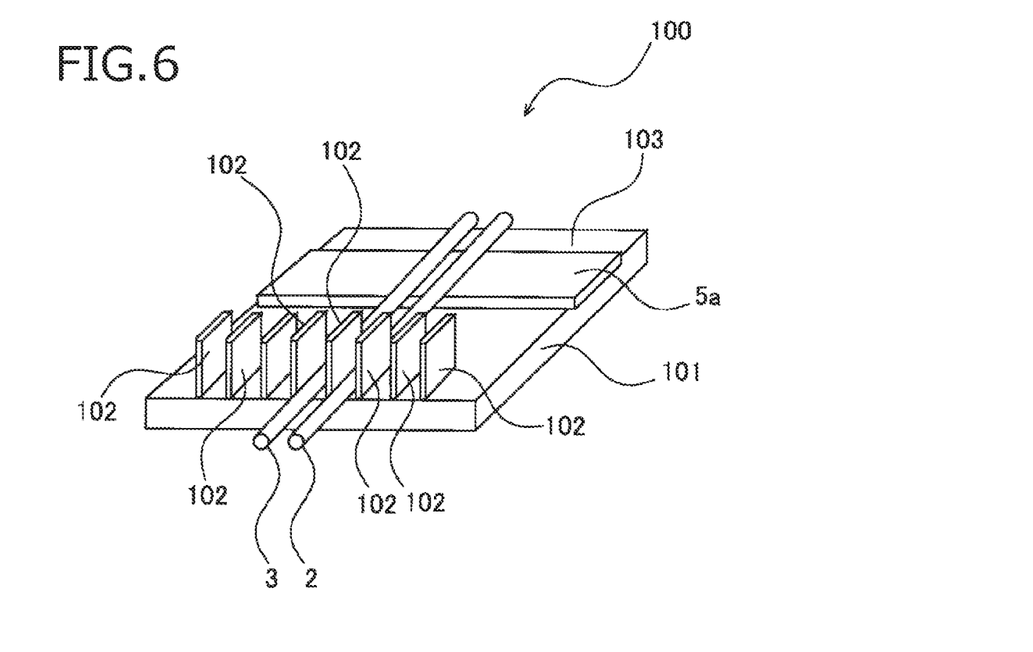
FIG. 6 is a process drawing showing the method of manufacturing the shielded electric wire according to the present embodiment, and showing an electric wire dividing jig used at the first step.

FIG. 6 shows an electric wire dividing jig used at the first step. As shown in FIG. 6, the electric wire dividing jig 100 is provided with a plate-form base 101 where the plurality of electric wires 2 and 3 are placed and a plurality of dividing plates 102 for placing the electric wires 2 and 3 on the base 101 in such a manner that they are separated one by one. The plurality of dividing plates 102 are provided parallel to each other and vertically to the base 101. The worker or the like places the electric wires between the dividing plates 102 one by one by using the electric wire dividing jig 100 at the first step, thereby parallelly disposing the plurality of electric wires 2 and 3 on the same plane at the predetermined interval.

Figure 7:
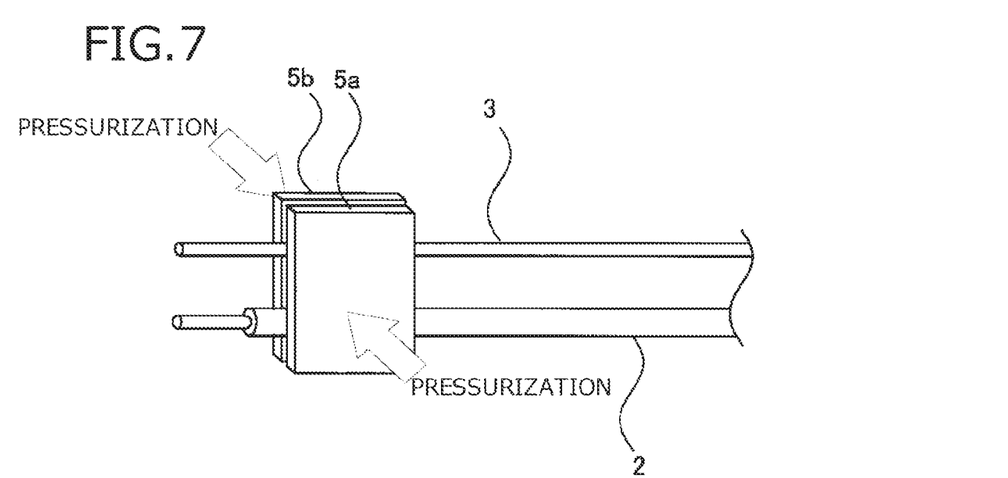
FIG. 7 is a process drawing showing the method of manufacturing the shielded electric wire according to the present embodiment, and showing a second step and a third step.

Then, as shown in FIG. 7, the worker or the like disposes two viscoelastic sheets 5a and 5b so as to sandwich the plurality of electric wires 2 and 3 parallelly disposed on the same plane (second step). While the plurality of electric wires 2 and 3 are sandwiched between the two viscoelastic sheets 5a and 5b in the example shown in FIG. 7, the present invention is not limited thereto and it may be performed to make one viscoelastic sheet U-shaped in cross section and dispose the plurality of electric wires 2 and 3 in the U shape so as to be sandwiched. Further, it is preferable that the viscoelastic sheets 5a and 5b each have a peelable protecting film so as not to adhere to the worker's hand. In this case, the protecting film is provided on the side not in contact with the plurality of electric wires 2 and 3. Moreover, the protecting film is peeled off by no later than a fifth step described later.

Moreover, at the second step, the following may be performed: As shown in FIG. 6, one viscoelastic sheet 5a is previously placed on a flat surface portion 103 of the electric wire dividing jig 100 and after the first step is completed, the other viscoelastic sheet 5b is placed on the one viscoelastic sheet 5a in such a manner as to sandwich the plurality of electric wires 2 and 3, thereby sandwiching the plurality of electric wires 2 and 3 between the two viscoelastic sheets 5a and 5b.

Further, when one viscoelastic sheet is made U-shaped in cross section and the plurality of electric wires 2 and 3 are sandwiched by using the electric wire dividing jig 100, one long viscoelastic sheet is previously placed on the flat surface portion 103 of the electric wire dividing jig 100 and after the first step is completed, the plurality of electric wires 2 and 3 are sandwiched by bending the one viscoelastic sheet into a U shape in cross section so as to sandwich the plurality of electric wires 2 and 3.

Figure 8:
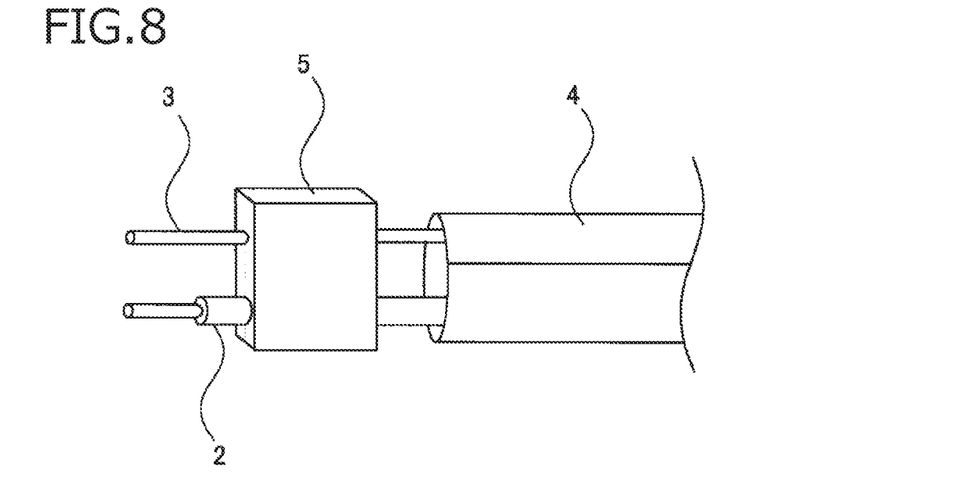
FIG. 8 is a process drawing showing the method of manufacturing the shielded electric wire according to the present embodiment, and showing a fourth step.

After sandwiching the plurality of electric wires 2 and 3 as described above, the worker or the like pressurizes the viscoelastic sheets 5a and 5b sandwiching the plurality of electric wires 2 and 3 (third step). At this time, the worker or the like pressurizes them in a direction where one side (the viscoelastic sheet 5a) and the other side (the viscoelastic sheet 5b) with the same plane as the borderline approach each other. Thereby, as shown in FIG. 8, the viscoelastic body 5 covering the peripheries of the electric wires 2 and 3 is formed on the end portion side of the electric wires 2 and 3.

Then, the worker or the like winds the metallic foil material 4 around the electric wires 2 and 3 (fourth step). At this time, the worker or the like winds the metallic foil material 4 around the electric wire base side of the viscoelastic body 5 so that the metallic foil material 4 is not situated on the viscoelastic body 5.

Figure 9:
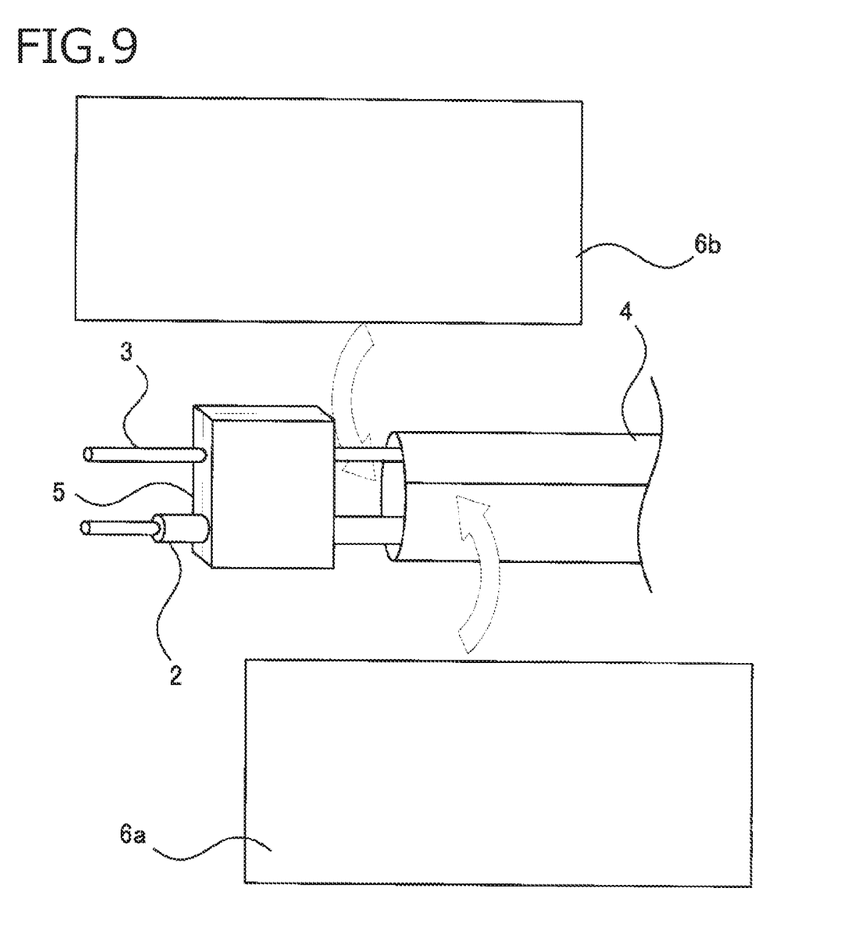
FIG. 9 is a process drawing showing the method of manufacturing the shielded electric wire according to the present embodiment, and showing a fifth step.
Figure 10:
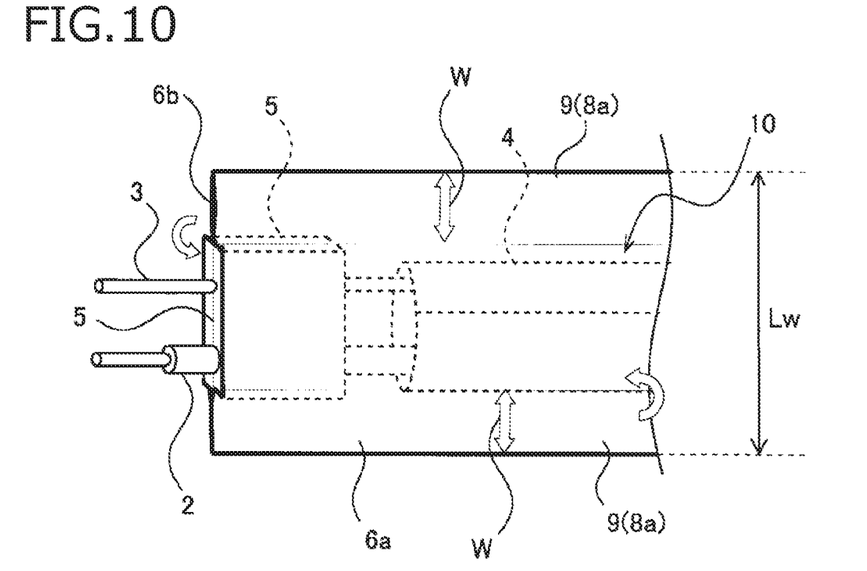
FIG. 10 is a process drawing showing the method of manufacturing the shielded electric wire according to the present embodiment, and showing the shielded electric wire after the fifth step and before a sixth step.

Thereafter, as shown in FIG. 9, the worker or the like pastes the first sheet member 6a and the second sheet member 6b onto the metallic foil material 4 and onto the viscoelastic body 5 (fifth step). Thereby, an aggregate as shown in FIG. 10 is obtained. Since the first sheet member 6a and the second sheet member 6b have the large width Lw as shown in FIG. 10, the adhesive layers 7a and 7b thereof are pasted together to form the pasted portions 9. The width (the length in the width direction) W of the pasted portions 9 is not less than 0.88 mm, preferably, 2.66 mm even at the shortest distance portion as mentioned above. Moreover, the pasted portions 9 are pasted together with a pressure of not less than 10 N and of an extent that does not break the first sheet member 6a and the second sheet member 6b.

Figure 11:
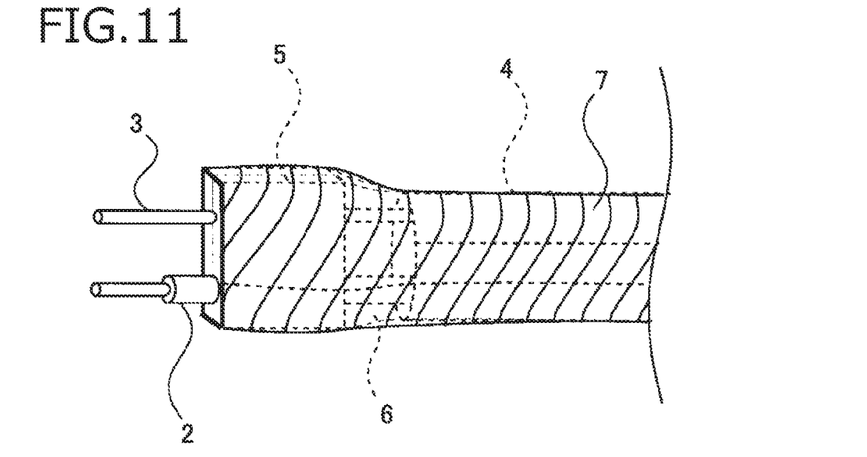
FIG. 11 is a process drawing showing the method of manufacturing the shielded electric wire according to the present embodiment, and showing the sixth step.

Thereafter, the worker or the like winds the pasted portions 9 on a trunk portion 10 which is the portion of the sheet member 6 other than the pasted portions 9, and then, as shown in FIG. 11, the protecting tape 7 is spirally wound on the sheet member 6 (sixth step). Thereby, the shielded electric wire 1 according to the present embodiment is manufactured.

Figure 12:
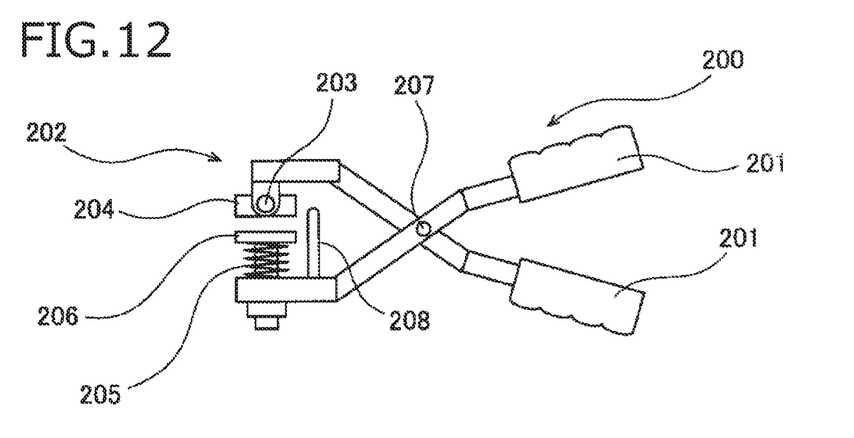
FIG. 12 is a plan view showing a compression jig used when viscoelastic sheets are pressurized.

For the pressurization at the above-described third step, the following jig is used: FIG. 12 is a plan view showing a compression jig used when the viscoelastic sheets 5a and 5b are pressurized. As shown in FIG. 12, the compression jig 200 has a substantially scissors-like shape, and is capable of pressurizing the viscoelastic sheets 5a and 5b in a direction where they approach each other by a pressurizing portion 202 provided at the end portion of the scissors by the action of gripping handle portions 201 of the scissors.

One side of the pressurizing portion 202 is a pressing portion 204 that is swingable by a screw shaft 203. Moreover, the other side of the pressurizing portion 202 is formed of a spring 205 and a plate material 206 provided on the end side of the spring 205. For this reason, when the worker or the like grips the handle portions 201, pressurization using the elastic force of the spring 205 is performed. Moreover, since the pressing portion 204 is swingable, the pressing portion 204 holds and pressurizes the viscoelastic sheets 5a and 5b while being parallel to the plate material 206.

Further, on the compression jig 200, a pressurizing force adjustment bar 208 is provided on a fulcrum 207 side of the pressurizing portion 202. This pressurizing force adjustment bar 208 is a rodlike member extending from the other side toward one side constituting the scissors, and is provided so as to prevent the handle portions 201 from being gripped more than estimated. Thereby, excess pressure is prevented from being applied to the pressurizing portion 202 to thereby prevent cracking in the viscoelastic body 5, breaking of the electric wires 2 and 3, peeling of the insulating covering of the covered electric wire 2 and the like.

Figure 13:
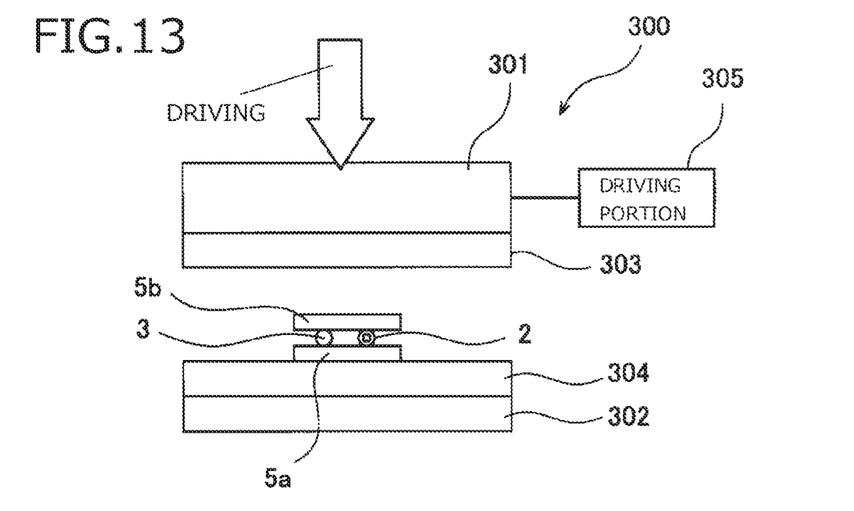
FIG. 13 is a structural view showing a pressurizing device used when the viscoelastic sheets are pressurized.

FIG. 13 is a structural view showing a pressurizing device used when the viscoelastic sheets 5a and 5b are pressurized. For the pressurization of the viscoelastic sheets 5a and 5b, the present invention is not limited to the case where the compression jig 200 is used, and the pressurizing device 300 may be used. As shown in FIG. 13, the pressurizing device 300 is provided with two pressing plates 301 and 302, two buffer materials 303 and 304 provided on the surfaces of the two pressing plates 301 and 302, respectively, and a driving portion 305 that makes the two pressing plates 301 and 302 approach each other to press the member therebetween.

It may be performed to dispose, between the two buffer materials 303 and 304, the viscoelastic sheets 5a and 5b sandwiching the plurality of electric wires 2 and 3 by using such a pressurizing device 300, drive the driving portion 305 and pressurize the viscoelastic sheets 5a and 5b with a predetermined pressure.

It is preferable that the buffer materials 303 and 304 have a hardness that can follow the deformation of the viscoelastic sheets 5a and 5b (for example, a hardness of not more than 10 degrees). This is because thereby, the buffer materials 303 and 304 can follow the deformation of the viscoelastic sheets 5a and 5b to dispose the viscoelastic body 5 without any gap between the electric wires 2 and 3. Moreover, although not shown, it is preferable that the compression jig 200 be also provided with buffer materials so as to be in contact with the viscoelastic sheets 5a and 5b.

Next, water-stopping-function-equipped shielded electric wires according to examples will be described. The water-stopping-function-equipped shielded electric wires according to the examples were made as follows: First, one drain wire and two covered electric wires were disposed on the same plane at an interval of not less than 1 mm, and one viscoelastic sheet (made of Gomunolnaki Co., Ltd, 1.5 t×10×20 mm) was bent into a U shape in cross section, and the plurality of electric wires were sandwiched in the U shape. Then, using the above-described pressurizing device using silicon with a hardness of 10 degrees as the buffer materials, the viscoelastic sheet was pressurized at 40 N for three seconds to form the viscoelastic body. Thereafter, a metallic foil material was wound on the electric wire base side of the viscoelastic body, and on the viscoelastic body and the metallic foil material, the first and second sheet materials (unirradiated heat-resistant fire-retardant vinyl tape made of Yazaki Corporation or fire-retardant vinyl adhesive tape No. 2239FRTV made of Nitto Denko Corporation) were pasted from the side where they face each other.

Then, the protecting tape (the same as the first and second sheet materials) was spirally wound on the first and second sheet materials.

An airtightness test was performed on the water-stopping-function-equipped shielded electric wire obtained as described above. In the airtightness test, two water-stopping-function-equipped electric wires were used, one ends (airtightly sealed sides) of the water-stopping-function-equipped electric wires having undergone water stopping processing using the viscoelastic body or the like was sunk into water (depth 100 mm), and compressed air (10 kPa [0.1 kgf/cm$^2$]) was sent from the other end for 30 seconds. When no air leakage was observed from the one end, the compressed air pressure was increased, and the compressed air pressure when air leaked from the one end was measured.

Here, in the water-stopping-function-equipped shielded electric wire of a first example, the adhesive force of the viscoelastic body to the plurality of the electric wires and the adhesive layer of the sheet member was 0.59 N/10 mm. Moreover, the adhesive force of the adhesive layer of the sheet member to the viscoelastic body was 0.59 N/10 mm. Further, the width of the pasted portion of the sheet member was 0.88 mm. In such a first example, the compressed air pressure when air leaked was 49 kPa. The compressed air pressure when air leaked was 49 kPa both when the first and second sheet members were made of Yazaki Corporation and when they were made of Nitto Denko Corporation.

Moreover, in the water-stopping-function-equipped shielded electric wire of a second example, the adhesive force of the viscoelastic body to the plurality of the electric wires and the adhesive layer of the sheet member was 1.79 N/10 mm. Moreover, the adhesive force of the adhesive layer of the sheet member to the viscoelastic body was 1.79 N/10 mm. Further, the width of the pasted portions of the sheet member was 2.66 mm. In such a second embodiment, the compressed air pressure when air leaked was 150 kPa. The compressed air pressure when air leaked was 150 kPa both when the first and second sheet members were made of Yazaki Corporation and when they were made of Nitto Denko Corporation.

From the above, it has been found that a water-stopping-function-equipped shielded electric wire with an airtightness of not less than 49 kPa can be provided by the adhesive forces and the width of the passed portion being higher values than those of the first example.

Further, the pullout load was measured by using the above-described first example, a third example where the first example was heated at 80 degrees C. for a first period of time and a fourth example where the first example was heated at 80 degrees C. for a second period of time. When the water-stopping-function-equipped shielded electric wires of the examples are heated, the viscoelastic body is hardened.

The measurement of the pullout load was performed as follows: First, the protecting tape was peeled off from the water-stopping-function-equipped shielded electric wire of each of the first example, the third example and the fourth example. Then, of the plurality of electric wires, the electric wires except one electric wire and the viscoelastic body were fixed, and the one electric wire was pulled out from the viscoelastic body.

At this time, regarding the first example, the pullout loads at three time measurements were 11.5 N, 13 N, and 11.5 N, respectively. Therefore, the average value was 12 N.

Regarding the third example, the pullout loads at three time measurements were 14.4 N, 14.6 N and 15.2 N, respectively. Therefore, the average value was 14.73 N.

Regarding the fourth example, the pullout loads at three time measurements were 13.7 N, 14.6 N and 15.5 N. Therefore, the average value was 14.6 N.

As described above, it has been found that the water-stopping-function-equipped shielded electric wires of the first example, the third example and the fourth example each have a pullout load of not less than 8 N and have a certain degree of airtightness. In particular, it has been found that when heating processing is applied, the viscoelastic body is hardened to further improve airtightness.

It has also been found that the degree of deformation of the viscoelastic body affects such a pullout load. The degree of deformation is obtained as follows: First, one gram of viscoelastic body was measured off from each of the first example, the third example and the fourth example, and this was shaped into 1 $cm^2$. Then, the shaped body was sandwiched between two metal plates and deformed by applying a load at 50 N for 60 seconds. Then, it was checked that it was deformed with a substantially uniform thickness, and 1 $cm^2$ was taken out from the deformed sample. Then, the thickness and weight of the cut-out sample were measured, and the thickness times the weight was defined as the degree of deformation.

Regarding the first embodiment, at the first measurement, the thickness was 1.97 mm and the weight was 0.3257 g, at the second measurement, the thickness was 2.07 mm and the weight was 0.2907 g, and at the third measurement, the thickness was 1.98 mm and the weight was 0.2892 g. The average values were 2.007 mm for the thickness and 0.302 g for the weight. For this reason, the degree of deformation was 0.605478.

Regarding the third embodiment, at the first measurement, the thickness was 2.37 mm and the weight was 0.3481 g, at the second measurement, the thickness was 2.17 mm and the weight was 0.3451 g, and at the third measurement, the thickness was 2.22 mm and the weight was 0.3147 g. The average values were 2.253 mm for the thickness and 0.336 g for the weight. For this reason, the degree of deformation was 0.757045.

Regarding the fourth embodiment, at the first measurement, the thickness was 2.3 mm and the weight was 0.3293 g, at the second measurement, the thickness was 2.25 mm and the weight was 0.3134 g, and at the third measurement, the thickness was 2.13 mm and the weight was 0.3088 g. The average values were 2.227 mm for the thickness and 0.317 g for the weight. For this reason, the degree of deformation was 0.706224.

When the pullout load is adopted for the horizontal axis and the degree of deformation is adopted for the vertical axis, the values (average values) of the first example, the third example and the fourth example were plotted and linearly approximated to obtain an expression $y=0.0479x+0.0292$. Here, y is the degree of deformation and x is the value of the pullout load. It has also been found that the degree of deformation satisfying not less than 8 N is not less than 0.4124 from the above expression.

As described above, according to the shielded electric wire 1 of the present embodiment, since the force of adhesion of the viscoelastic body 5 to the plurality of electric wires 2 and 3 and the adhesive layers 7a and 7b of the sheet member 6 is not less than 0.59 N/10 mm and the force of adhesion of the adhesive layers 7a and 7b of the sheet member 6 to the viscoelastic body 5 is not less than 0.59 N/10 mm, the moisture entering through the gap between the electric wires 2 and 3 and the viscoelastic body 5 and the gap between the viscoelastic body 5 and the sheet member 6 is suppressed by a predetermined adhesive force. Moreover, since the width of the pasted portions 9 of the sheet member 6 is set to not less than 0.88 mm, the moisture entering through the gap at the pasted portions 9 can also be suppressed by securing the width (length) of the pasted portions 9. By these, the shielded electric wire 1 capable of having a more stable airtightness can be provided.

Moreover, since the force of adhesion of the viscoelastic body 5 to the plurality of electric wires 2 and 3 and the adhesive layers 7a and 7b of the sheet member 6 is not less than 1.79 N/10 mm and the force of adhesion of the adhesive layers 7a and 7b of the sheet member 6 to the viscoelastic body 5 is not less than 1.79 N/10 mm, the moisture entering through the gap between the viscoelastic body 5 and the sheet member 6 is suppressed by a higher adhesive force. Moreover, since the width of the pasted portions 9 of the sheet member 6 is set to not less than 2.66 mm, the moisture entering through the gap at the pasted portions 9 can also be further suppressed. Consequently, the shielded electric wire 1 capable of satisfying a higher airtightness can be provided.

Moreover, since the viscoelastic body 5 is disposed only on the one electric wire end portion side, the shielded electric wire 1 can be provided that is suitable for a case where, for example, only one side is disposed in an environment of being exposed to rain water such as in the engine room and the other side is disposed in an environment of not being exposed to rain water such as in the vehicle interior.

Moreover, since the pullout load when the viscoelastic body 5 is fixed and the plurality of electric wires 2 and 3 are each pulled out is not less than 8 N, the shielded electric wire 1 can be provided that has an airtightness of not less than a certain degree regarding between the electric wires 2 and 3 and the viscoelastic body 5.

Further, according to the wire harness WH according to the present embodiment, since at least one circuit of the shielded electric wire 1 described above is provided, the wire harness WH can be provided that has the shielded electric wire 1 suitable for the environment of being exposed to rain water such as in the engine room of a car.

Next, a second embodiment of the present invention will be described. While a water-stopping-function-equipped shielded electric wire according to the second embodiment is similar to that of the first embodiment, the structure of the sheet member 6 is different from that of the first embodiment.

Figure 14:
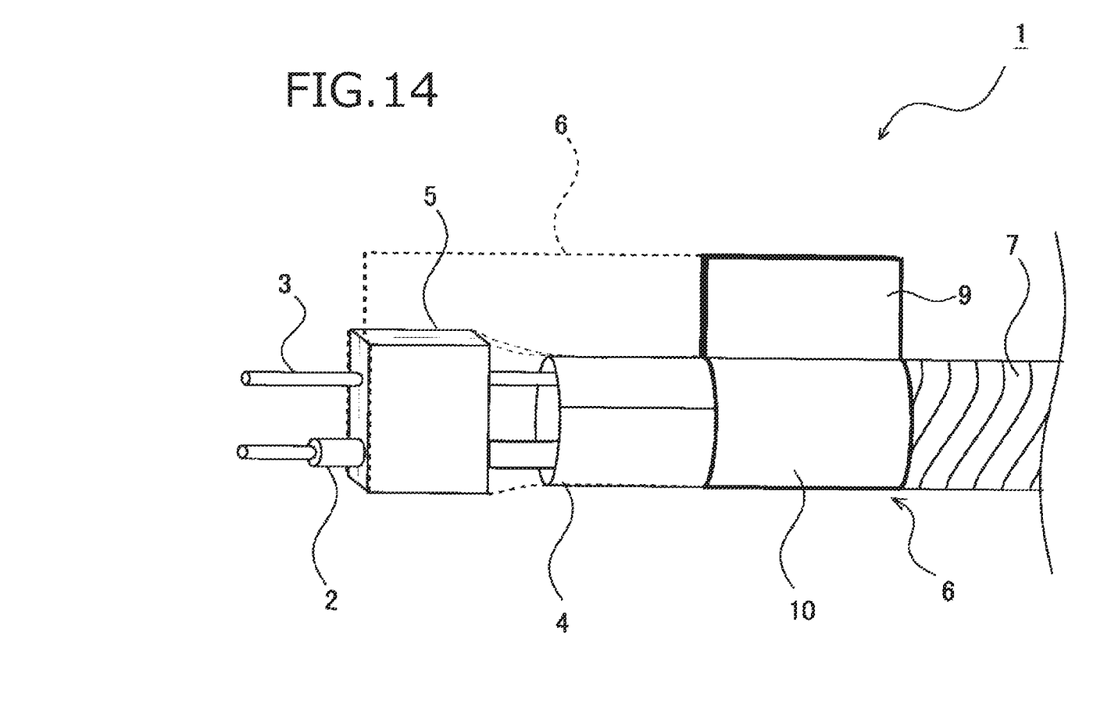
FIG. 14 is a perspective view showing the shielded electric wire according to a second embodiment.

FIG. 14 is a perspective view showing the shielded electric wire 1 according to the second embodiment. As shown in FIG. 14, in the shielded electric wire 1 according to the second embodiment, the sheet member 6 is formed of one sheet. Moreover, in the second embodiment, the sheet member 6 is pasted onto the metallic foil material 4 and the viscoelastic body 5 in such a manner as to be substantially U-shaped in cross section with the adhesive layer inside (a shape where the end sides of the U shape are in contact). Both end portion sides of the sheet member 6 form the pasted portion 9 where the adhesive layers are pasted together so as to protrude from the metallic foil material 4 and the viscoelastic body 5.

The pasted portion 9 is wound on the trunk portion 10 which is the part of the sheet member 6 other than the pasted portion 9 before the protecting tape 7 is spirally wound.

Next, a method of manufacturing the shielded electric wire 1 according to the second embodiment will be described. Since the first to fourth steps of the method of manufacturing the shielded electric wire 1 according to the second embodiment are the same, descriptions thereof are omitted.

After the metallic foil material 4 around the electric wires 2 and 3 are wound, the worker or the like pastes the sheet member 6 onto the metallic foil material 4 and the viscoelastic body 5 in such a manner as to be substantially U-shaped in cross section with the adhesive layer of the sheet member 6 inside (fifth step). At this step, in the sheet member 6, the pasted portion 9 where the adhesive layer is pasted together is formed at the parts protruding from the surfaces of the metallic foil material 4 and the viscoelastic body 5. The width (the length in the width direction) W of the pasted portion 9 is not less than 0.88 mm, preferably, 2.66 mm, even at the shortest distance portion as in the first embodiment. Moreover, the pasted portion 9 is pasted together with a pressure of not less than 10 N and of an extent that does not break the sheet member 6.

Thereafter, the worker or the like winds the pasted portion 9 on the trunk portion 10 which is the portion other than the pasted portion 9, and then, the protecting tape 7 is spirally wound on the sheet member 6 (sixth step). Thereby, the shielded electric wire 1 according to the second embodiment is manufactured.

Since the examples are similar to those of the first embodiment, descriptions thereof are omitted.

As described above, according to the shielded electric wire 1 of the second embodiment, as in the first embodiment, the shielded electric wire 1 capable of having a more stable airtightness and the shielded electric wire 1 capable of satisfying a higher airtightness can be provided. Moreover, the shielded electric wire 1 can be provided that is suitable for a case where, for example, only one side is disposed in an environment of being exposed to rain water such as in the engine room and the other side is disposed in an environment of not being exposed to rain water such as in the vehicle interior. In addition, the shielded electric wire 1 can be provided that has an airtightness of not less than a certain degree regarding between the electric wires 2 and 3 and the viscoelastic body 5.

Further, according to the wire harness WH of the second embodiment, as in the first embodiment, the wire harness WH can be provided that has the shielded electric wire 1 suitable for an environment of being exposed to rain water such as in the engine room of a car.

While the invention is described above based on the embodiments, the present invention is not limited to the above-described embodiments; modification may be made without departing from the gist of the present invention or a different technology such as a known one may be combined.

For example, in the above-described embodiments, it is preferable that the width of the pasted portion 9 be a length where the pasted portion 9 is wound once or more around the trunk portion 10 when the pasted portion 9 is wound around the trunk portion 10 of the sheet member 6. That is, in the first embodiment, a width is provided that enables each of the two pasted portions 9 to be wound half or more around it and in the second embodiment, a width is provided that enables one pasted portion 9 to be wound once or more around it. This is because thereby, resistance to abrasion can be improved by winding the pasted portion 9 once or more around the trunk portion 10.

Further, in the first embodiment, since the structure is such that the first and second sheet members 6a and 6b are pasted together, sheet members with a large thickness can be used for the first and second sheet members 6a and 6b. That is, when the sheet member 6 is made U-shaped in cross section and pasted together as in the second embodiment, if the thickness of the sheet member 6 is large, a force acts so as to open the sheet member 6 and this makes the pasted portion 9 readily peel off. However, in the first embodiment, since the structure is such that the first and second sheet members 6a and 6b are pasted together, such a force is difficult to act and a sheet member with a large thickness (for example, a thickness of not less than 3 mm or not more than 10 mm) can be used for the sheet member 6, so that resistance to abrasion can also be improved.

Figure 15:
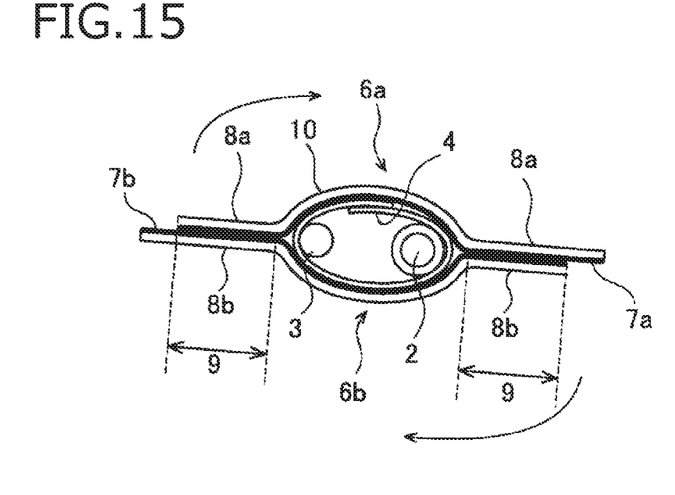
FIG. 15 is a cross-sectional view showing a modification of the shielded electric wire according to the first embodiment.

Further, the shielded electric wire 1 according to the first embodiment may be as shown in FIG. 15. FIG. 15 is a cross-sectional view showing a modification of the shielded electric wire 1 according to the first embodiment. As shown in FIG. 15, the surplus portion 8a of the first sheet member 6a and the surplus portion 8b of the second sheet member 6b are pasted together in a state of being shifted from each other. For this reason, in one surplus portions 8a and 8b, the adhesive layer 7a of the first sheet member 6a has a portion not in contact with the adhesive layer 7b of the second sheet member 6b, and in the other surplus portions 8a and 8b, the adhesive layer 7b of the second sheet member 6b has a portion not in contact with the adhesive layer 7a of the first sheet member 6a. This is because consequently, the surplus portions 8a and 8b can be pasted to the trunk portion 10 and the like by winding the surplus portions 8a and 8b so that the portions (the adhesive layers 7a and 7b) not in contact are inside.

Figure 16A:
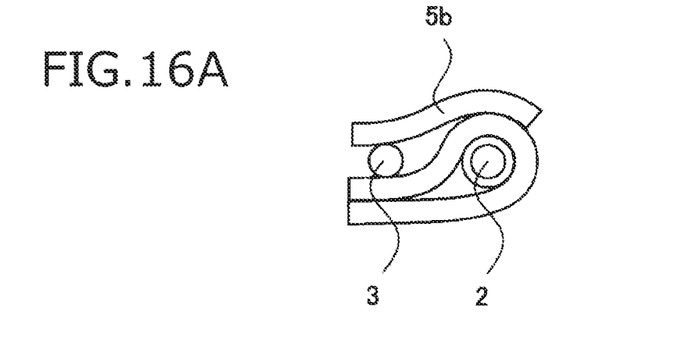
FIGS. 16A to 16C are cross-sectional views showing modifications of the method of manufacturing the shielded electric wire, FIG. 16A showing a first example, FIG. 16B showing a second example and FIG. 16C showing a third example.
Figure 16B:
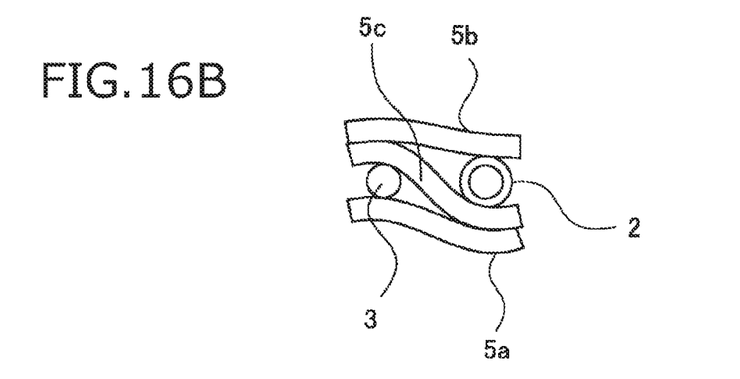
Figure 16C:
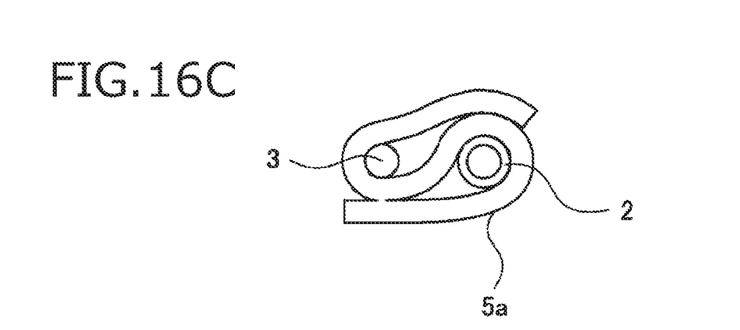

Further, in the method of manufacturing the shielded electric wire 1 according to the above-described embodiments, at the second step, a viscoelastic sheet may be disposed as shown in FIG. 16. FIG. 16 is cross-sectional views showing modifications of the method of manufacturing the shielded electric wire 1, FIG. 16A shows a first example, FIG. 16B shows a second example, and FIG. 16C shows a third example. As shown in FIGS. 16A to 16C, at the second step, various methods of sandwiching may be adopted as long as the plurality of electric wires 2 and 3 can be sandwiched by a viscoelastic sheet. Further, by disposing a viscoelastic sheet between the electric wires 2 and 3 as shown in FIGS. 16A to 16C, the viscoelastic body 5 can be appropriately disposed between the electric wires 2 and 3 after pressurization, so that airtightness can be secured more reliably.

Specifically, as shown in FIG. 16A, it may be performed to wind one electric wire 2 by one viscoelastic sheet 5a, place another electric wire 3 on the viscoelastic sheet 5a and place the other viscoelastic sheet 5b thereon to thereby sandwich the plurality of electric wires 2 and 3. Moreover, as shown in FIG. 16B, it may be performed to dispose one viscoelastic sheet 5c with one electric wire 2 upside and the other electric wire 3 downside and dispose the two viscoelastic sheets 5a and 5b above and below these to thereby sandwich the plurality of electric wires 2 and 3. Further, as shown in FIG. 16C, it may be performed to wrap one electric wire 2 with one viscoelastic sheet 5a and then, further wrap another electric wire 3 to thereby sandwich the plurality of electric wires 2 and 3.

Further, while the protecting tape 7 is spirally wound on the outermost periphery of the shielded electric wire 1 in the above-described embodiments, the present invention is not limited thereto and the protecting tape 7 may be provided by a winding method other than spiral winding. Moreover, a resin sheath may be provided instead of the protecting tape 7, or a sheath may be provided outside the protecting tape 7.

In addition, while the shielding layer is formed of the metallic foil material 4 in the above-described embodiment, the present invention is not limited to the metallic foil material 4 and the shielding may be formed of a braid formed by twisting metallic wires. Further, the winding method of the metallic foil material 4 is not limited to that of the above-described embodiments.

Moreover, while the viscoelastic body 5 is formed before the metallic foil material 4 is wound around the peripheries of the electric wires 2 and 3 in the present embodiment, the present invention is not limited thereto and the viscoelastic body 5 may be formed after the metallic foil material 4 is wound around the peripheries of the electric wires 2 and 3.

What is claimed is:

1. A shielded electric wire, comprising: a plurality of electric wires; a shielding member that covers peripheries of the plurality of electric wires; a viscoelastic body attached between end portions of the plurality of electric wires and the shielding member and that covers the peripheries of the plurality of electric wires; a sheet member that covers peripheries of the shielding member and the viscoelastic body; and a protecting member provided around the sheet member, wherein the sheet member comprises a first sheet member and a second sheet member; wherein adhesive layers are formed on a surface of each of the first and second sheet members respectively, and the adhesive layers are pasted onto the shielding member and onto the viscoelastic body so as to face to each other so that a pasted portion in which the adhesive layers at one end portions of the first and second sheet members protruding in a width direction are pasted together is formed, the width direction being substantially perpendicular to an extending direction of the plurality of electric wires; wherein a force of adhesion of the viscoelastic body to the plurality of electric wires and the adhesive layers of the first and second sheet member is not less than 0.59 N/10 mm; wherein a force of adhesion of the adhesive layers of the first and second sheet members to the viscoelastic body is not less than 0.59 N/10 mm; and wherein a width of the pasted portion of the first and second sheet member is not less than 0.88 mm.

2. The shielded electric wire according to claim 1, wherein the adhesive layers of the first and second sheet members are pasted onto the shielding member and onto the viscoelastic body so as to face to each other so that a second pasted portion in which the adhesive layers at the other end portions of the first and second sheet members protruding in a direction opposite to the width direction is formed; and wherein a width of the second pasted portion of the first and second sheet member is not less than 0.88 mm.

3. The shielded electric wire according to claim 1, wherein the other end portions of the first and second sheet members are continuously connected to each other so as to be substantially U-shaped in cross section.

4. The shielded electric wire according to claim 1, wherein the force of adhesion of the viscoelastic body to the plurality of electric wires and the adhesive layer of the sheet member is not less than 1.79 N/10 mm;
   wherein the force of adhesion of the adhesive layers of the first and second sheet members to the viscoelastic body is not less than 1.79 N/10 mm; and
   wherein the width of the pasted portion of the sheet member is not less than 2.66 mm.

5. The shielded electric wire according to claim 1, wherein the viscoelastic body is disposed only between end portions of the plurality of electric wires and the shielding member.

6. The shielded electric wire according to claim 1, wherein a pullout load when the plurality of electric wires are each pulled out while the viscoelastic body is fixed is not less than 8 N.

7. A wire harness comprising at least one circuit of the shielded electric wire according to claim 1.

* * * * *